United States Patent [19]

Schmitt

[11] 4,162,016

[45] Jul. 24, 1979

[54] ARTICLE STACKER WITH OVERHEAD FINGER RAKE

[75] Inventor: Robert A. Schmitt, Vancouver, Wash.

[73] Assignee: Columbia Machine, Inc., Vancouver, Wash.

[21] Appl. No.: 893,004

[22] Filed: Apr. 3, 1978

[51] Int. Cl.² .............................................. B65G 57/10
[52] U.S. Cl. ...................................... 414/85; 198/748; 414/89
[58] Field of Search ..................... 214/6 DK, 6 P, 6 F; 198/741, 747, 748; 271/84, 269; 93/93 DP

[56] References Cited

U.S. PATENT DOCUMENTS

| | | | |
|---|---|---|---|
| 3,594,977 | 7/1971 | Grasvoll | 214/6 DK X |
| 3,637,093 | 1/1972 | Brockmuller et al. | 214/6 P |
| 3,659,728 | 5/1972 | Reinecke | 271/218 X |
| 3,679,072 | 7/1972 | Mueller | 93/93 DP X |

Primary Examiner—L. J. Paperner
Attorney, Agent, or Firm—Kolisch, Hartwell, Dickinson & Stuart

[57] ABSTRACT

A palletizer for stacking articles. The apparatus comprises a vertically shiftable layer-arranging table, a vertically shiftable stacking platform and a transfer carriage horizontally shiftable between positions overlying the layer-arranging table and the stacking platform. The upper surfaces of the layer-arranging table and the transfer carriage are formed of a plurality of laterally-spaced members, these members defining therebetween table and carriage channels, respectively. Also disclosed is a horizontally shiftable rake having a plurality of laterally-spaced, downwardly projecting tines positioned to be received within the table and carriage channels. The layer-arranging table is initially adjusted to a lowered position for receiving articles thereon. The table is then raised to a position horizontally adjacent the transfer carriage and rake shifted downstream, raking the articles onto the carriage. The projection of the rake tines into the table channels, and subsequently into the carriage channels, ensures that the lowermost articles are transported in the raking operation. With the rake stationarily held at its position overlying the stacking platform, the layer-arranging table is lowered and the transfer carriage shifted from its position overlying the stacking platform to its position overlying the layer-arranging table, whereupon the sheets are wiped onto the stacking platform.

5 Claims, 7 Drawing Figures

4,162,016

ARTICLE STACKER WITH OVERHEAD FINGER RAKE

BACKGROUND AND SUMMARY

This invention relates to an article handling system. More specifically, it relates to an apparatus for palletizing sheets or the like.

Sheets, such as flattened boxes which have yet to be shaped into a carton configuration, are prepared for factory storage or shipment by palletizing the sheets into suitable-sized stacks. Automatic stackers used in the palletizing of cardboard sheets or the like often employ a sweep plate which sweeps across the surface of a loading table, to transfer sheets from the table to a transfer carriage.

Such sweep plates have not been entirely satisfactory in that the clearance between the plate and the loading table and transfer carriage may be greater than the thickness of the sheets being transferred, with the result that the lowermost sheet or sheets may become wedged between the sweep plate and the loading table or carriage. When this occurs, the stacking operation must be interrupted to remove and re-stack the lowermost sheets. This occurs at considerable expense in terms of manpower and machinery efficiency.

In the present invention, there is provided a layer-arranging table, the surface of which may be formed of a plurality of laterally-spaced elongate support members, and a transfer carriage, the surface of which may be formed of a plurality of laterally-spaced, elongate slats. The elongate support members define therebetween channels which are longitudinally aligned with channels defined by the slats of the transfer carriage. A sweep device for transferring articles from the layer-arranging table to the transfer carriage includes a rake having a plurality of laterally-spaced tines, the donwardly-directed ends of which are positioned to extend into the channels of the layer-arranging table and the transfer carriage. This assures that the tines engage the edges of all of the articles, regardless of the thickness of the articles, as the rake sweeps articles from the layer-arranging table to the transfer carriage.

Further provided is a stacking platform on which the article stack is formed. In transferring articles thereon, the rake is positioned vertically adjacent the stacking platform, and the transfer carriage shifted horizontally to a position overlying the layer-arranging table. Because the free ends of the rake tines extend into the channels of the transfer carriage, the tines engage the edges of all of the articles as they are wiped from the transfer carriage onto the stacking platform.

It is a primary object of the present invention to provide a palletizer for stacking sheets or the like, in which all of the sheets are positively engaged when the sheets are horizontally transferred to and from a transfer carriage.

It is a further object of the present invention to provide such a palletizer having a channelled layer-arranging table, a channelled transfer carriage, and a horizontally shiftable rake having a plurality of tines which extend into the channels of the table and carriage.

A further object of the present invention is to provide a palletizer for stacking sheets or the like which is substantially trouble-free during operation.

THE DRAWINGS

These and other objects and features of the present invention will now be described with reference to the following detailed description of a preferred embodiment and the accompanying drawings, wherein.

Figure 2:
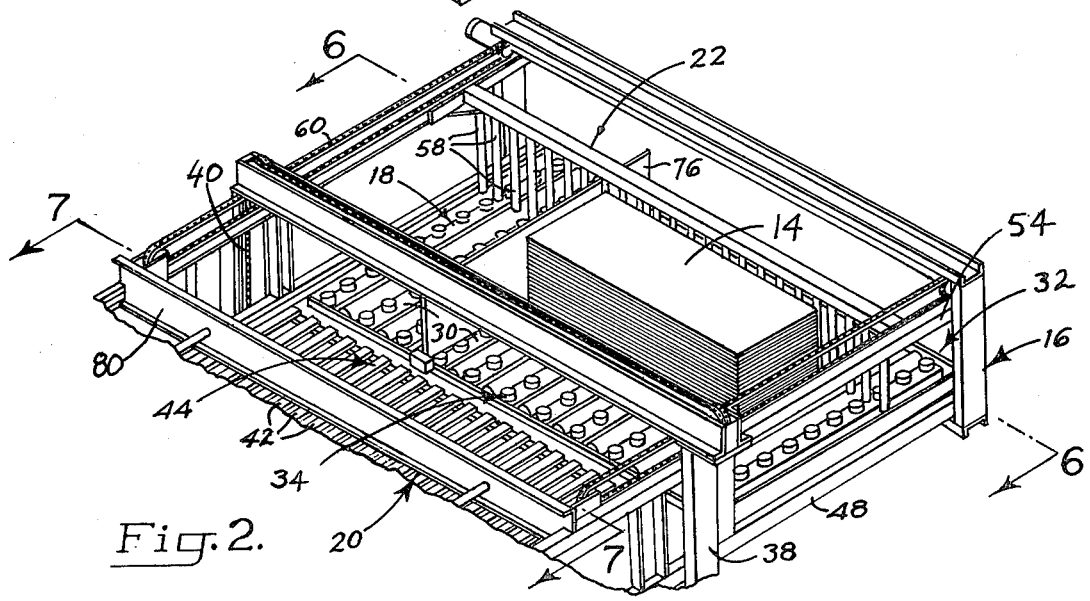
FIG. 2 is a fragmentary perspective view of the palletizer illustrating the initiation of transfer of sheet articles from the layer-arranging table to the transfer carriage.
Figure 6:
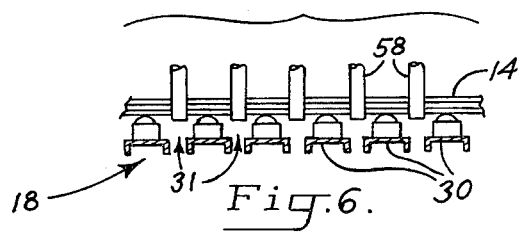
Figure 7:
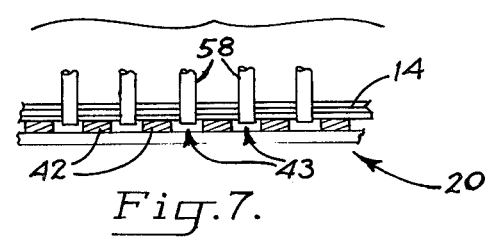

FIG. 6 is an enlarged, fragmentary, front elevation view taken along a portion of the line 6—6 of FIG. 2, showing the extension of the free ends of the rake tines into the channels between the article support members of the layer-arranging table; and FIG. 7 is an enlarged, fragmentary front elevation view taken along a portion of line 7—7 of FIG. 2, but showing the rake positioned such that the free ends of the rake tines extend into the channels defined by the transfer carriage slats.

DETAILED DESCRIPTION OF THE PREFERRED EMBODIMENT

Figure 1:
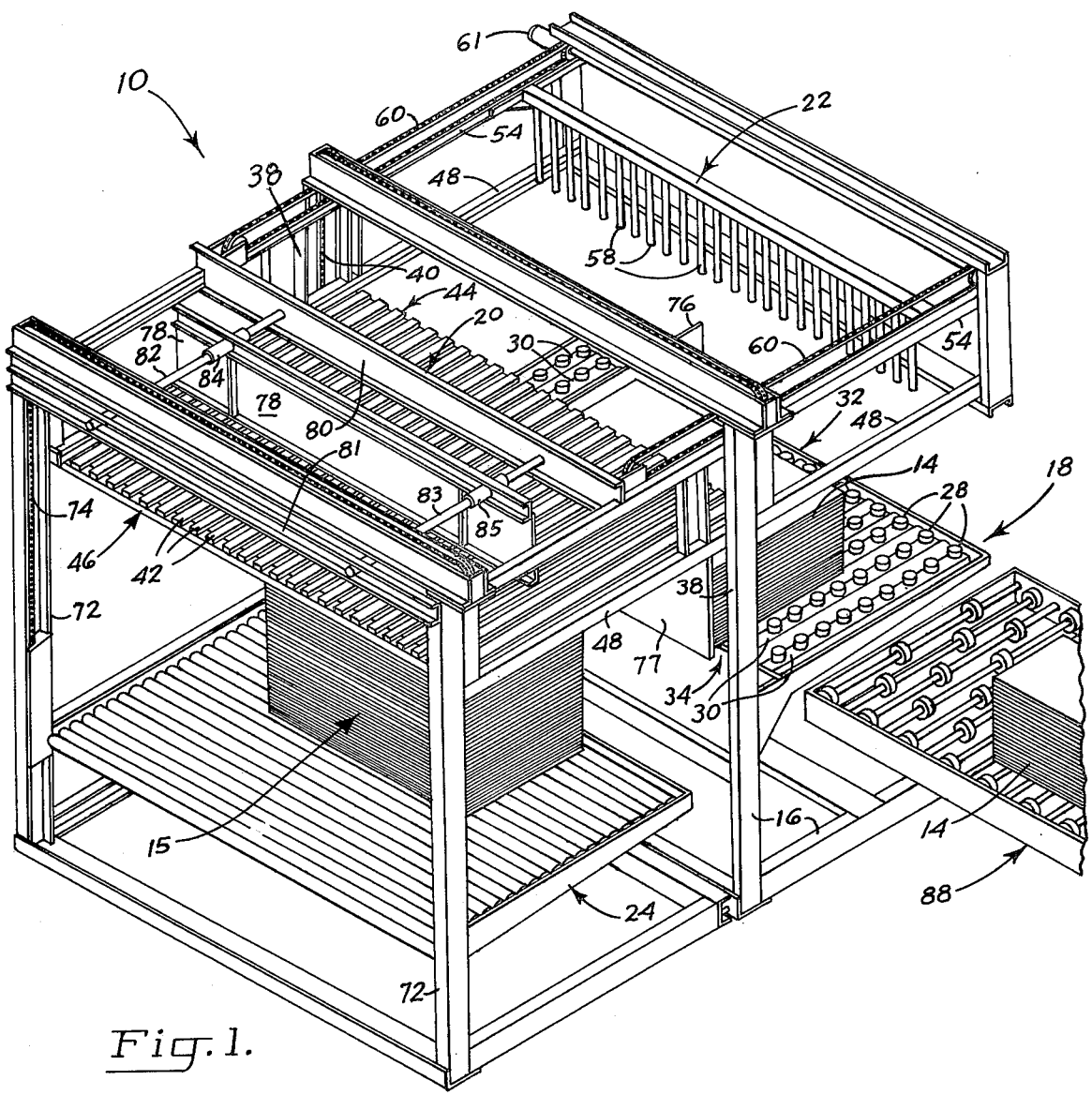
FIG. 1 is a perspective view of the palletizer constructed according to an embodiment of the present invention.

Referring now to FIG. 1, there is shown generally at 10 a palletizer constructed according to a preferred embodiment of the present invention. This apparatus is designed to palletize articles 14 such as a tier of cardboard sheets or the like, into an even-edged stack of sheet articles, such as shown at 15, which can be bound or otherwise prepared for shipping.

The palletizer comprises a main frame 16 on which are mounted vertically shiftable layer-arranging table 18, a horizontally shiftable transfer carriage 20, a horizontally-shiftable overhead rake 22 and a vertically shiftable stacking platform 24.

The horizontally-disposed layer-arranging table has a plurality of ball rollers 28 forming its upper surface. These ball rollers allow articles to be stacked to move across the surface of the table in a relatively friction-free manner, thus facilitating the positioning of the articles on the table. The ball rollers are arranged to form a plurality of laterally-spaced, article-support members 30, defining elongate laterally-spaced channel 31 therebetween (FIG. 6). The opposed end portions of these members define upstream and downstream table end portions 32 and 34 respectively.

Figure 3:
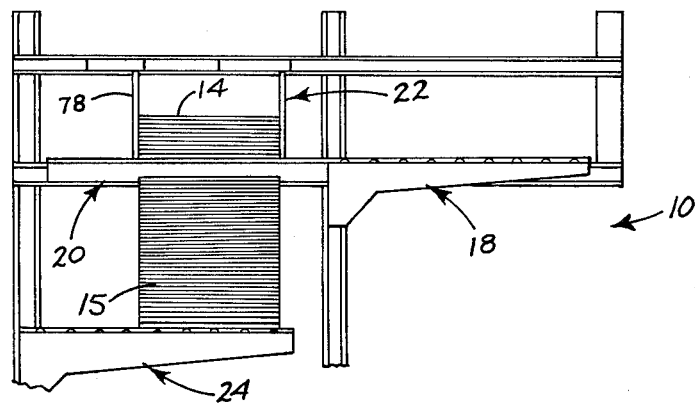
FIG. 3 is a side elevation, diagrammatic view of the invention shown after the transfer of sheet articles from the raised layer-arranging table to the transfer carriage.

Table 18 is conventionally mounted adjacent its downstream portion on a pair of vertical tracks 38 for vertical shifting between a lowered position (as seen in FIG. 1) and a raised position in which the table is horizontally adjacent the transfer carriage (as seen in FIGS. 2 and 3). The layer-arranging table is raised and lowered by table shifting means including a pair of motor driven chains, such as chain 40.

Transfer carriage 20 is a horizontally-disposed table on which are mounted a plurality of laterally-spaced elongate slats 42 defining elongate laterally-spaced channels 43 therebetween (FIG. 7). The front and rear portions of slats 42 define the upstream and downstream end portions 44 and 46 of the transfer carriage. Slats 42 are longitudinally aligned with article support members 30 and the surface defined by the top of slats 42 is coplanar with the upper surface of the table ball rollers 28 when table 18 is in its raised position. Channels 31 are thus horizontally and longitudinally aligned with channels 43 with table 18 in its raised position, as seen in FIG. 2.

The transfer carriage is slidably mounted along its side edges on a pair of horizontal tracks 48. Shifting means, generally including an elongate fluid-powered ram (not shown) connected at one end to carriage 20 and at its other end to frame 16, is operable to shift the transfer carriage from a first, or upstream position overying the layer-arranging table to a second, or downstream position directly overlying the stacking platform (FIG. 1).

Overhead rake 22 is mounted on a pair of upper horizontal tracks 54 for shifting horizontally from a first, or upstream position overlying the layer-arranging table to a second, or downstream position overlying the stacking platform. Shifting means for shifting the rake between such positions generally includes a pair of endless chains, such as chain 60. Rake 22 includes a plurality of laterally-spaced tines 58, the downwardly projecting ends of which are positioned to extend into channels 31 and 43 as the rake is shifted across the layer-arranging table and the transfer carriage, with table 18 in its raised position, as shown in FIGS. 2 and 3. The projection of tines 58 into channels 31 and 43 is shown in FIGS. 6 and 7, respectively. Thus, as the overhead rake is moved longitudinally across the surfaces of the layer-arranging table and the transfer carriage, tines 58 positively engage edges of all of the transferred articles.

Stacking platform 24 is shiftably mounted on a pair of vertical tracks 72, in a manner similar to the conventional mounting of layer-arranging table 18 on vertical tracks 38. Shifting means, generally including an elongate fluid-operated ram connected to a pair of chains, such as chain 74, is used in moving the stacking platform from the position shown in FIG. 1, in which the stacking pallet is spaced substantially below the plane of transfer carriage, to a position in which the stacking pallet is directly adjacent the underside of the transfer carriage with the latter in its downstream position.

The apparatus further comprises guide means for positioning articles on the layer-arranging table, and article stop means for positioning the downstream edges of articles 14 raked into the transfer carriage.

The layer-arranging table guide means shown in FIG. 1 includes orthogonally disposed vertical plates 76, 77 which receive thereagainst side and downstream edges of articles 14 loaded on the layer-arranging table. Plate 77 is attached to frame 16 adjacent the downstream end portion of the layer-arranging table, with such in its lowered position (FIG. 1). Plate 76 is shiftably attached to the layer-arranging table for horizontal shifting between selected positions, wherein plate 76 is vertically aligned with one of the article support members. The height of plate 76 is less than the length of tines 58, so that rake 22 clears the upper edge of plate 76 when the layer-arranging table is in its raised position, as seen in FIG. 2.

With reference to FIG. 1, article stop means is a vertical plate 78 mounted between two transverse beams 80, 81 for adjustment therebetween. A pair of threaded rods 82, 83 extending between beams 80, 81 are threadably received within sleeves 84, 85, respectively, secured to plate 78. Rotation of rods 82, 83 results in shifting of plate 78 between beams 80, 81 to selected guide positions.

The operation of the palletizer will now be described. To initiate the stacking operation the layer-arranging table, the overhead rake, and the transfer carriage are positioned as shown in FIG. 1. A tier of articles, such as cardboard sheets or the like, is loaded onto the layer-arranging table, either directly or via a feed chute 88. The tier of articles is positioned on the loading table against plates 76, 77. For placement of the first layer, or tier, of articles the stacking platform 24 would be raised to a position closely underlying the transfer carriage.

The layer-arranging table is then elevated to a position horizontally adjacent the transfer carriage. The overhead rake is now vertically adjacent the upstream portion of the layer-arranging table (as seen in FIG. 2) with the rake tines extending into the channels between the article-support members on the transfer plate (as seen in FIG. 6). The overhead rake is then shifted downstream toward the transfer carriage until the rake is vertically adjacent the upstream end portion of the transfer carriage, raking articles 14 onto the transfer carriage (FIG. 3). At this position the rake tines 58 extend into channels 43 of the transfer carriage, as seen in FIG. 7, ensuring engagement between the rake tines and the lowermost transferred articles.

Figure 4:
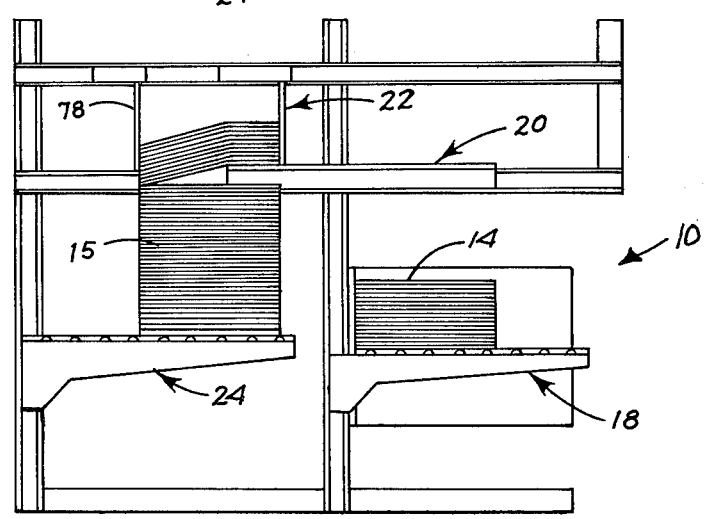
FIG. 4 shows the same view of the invention during which the articles are being wiped from the transfer carriage onto the stacking platform.

Referring now to FIG. 4, articles 14 are positioned between plate 78 and rake 22, squaring the upstream and downstream edges of the articles. To transfer these articles onto the stacking platform, or onto previously deposited articles forming a stack, indicated at 15, the layer-arranging table is first shifted toward its lowered position. Then, with the rake held stationarily at its downstream position shown in FIG. 4, the transfer carriage is shifted upstream (to the right in FIG. 4) from a position directly over the stacking platform (FIG. 3) to a position directly over the layer-arranging table. As seen in FIG. 4, this operation serves to wipe articles 14 from the transfer carriage onto stack 15. As the transfer carriage shifts longitudinally relative to the upstream-positioned rake, the extension of the tines 58 into channels 43 ensures that all of the articles are wiped onto the stack.

Figure 5:
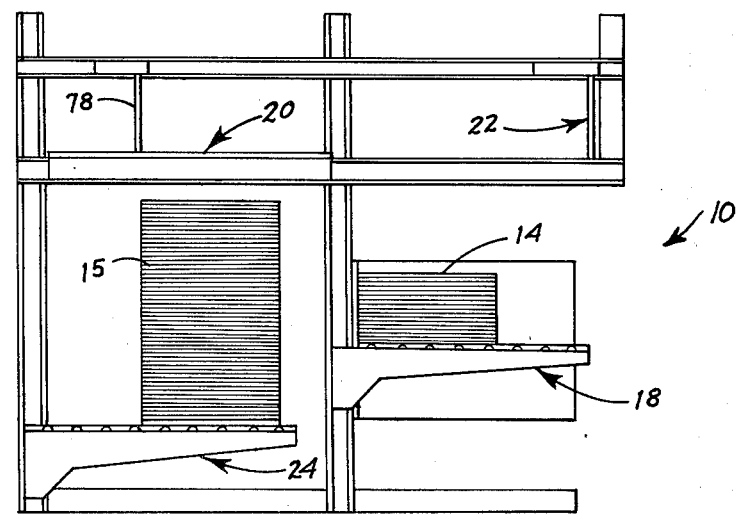
FIG. 5 shows the same view of the invention after the loading of sheet articles onto the lowered layer-arranging table.

Simultaneous with the transfer of articles from the transfer carriage to the stacking platform, a new tier of articles is loaded onto the layer-arranging table (FIG. 5). Following such transfer, the transfer carriage is returned to its position overlying the stacking platform, the overhead rake is returned to its position vertically adjacent the upstream portion of the layer-arranging table, and this table is elevated to its position horizontally adjacent the transfer carriage. The sequence is repeated as desired until a full stack of articles is built up on the stacking platform.

Thus, a palletizer designed to stack articles such as sheets, or the like has been disclosed. While a specific preferred embodiment has been described and illustrated, it will be obvious to those skilled in the art that various modifications may be made without departing from the spirit of the invention.

It is claimed and desired to secure by Letters Patent:
  1. Article stacking apparatus comprising a layer-arranging table, the upper surface of which is formed by a plurality of laterally-spaced article support members defining channels therebetween, a transfer carriage horizontally adjacent said layer-arranging table, the upper surface of said carriage being formed by a plurality of laterally-spaced elongate slats defining channels therebetween, and an overhead rake horizontally shiftable between a first position overlying said layer arranging table, and a second position overlying said transfer carriage, said rake including a plurality of laterally-spaced tines having downwardly projecting ends which are positioned to extend into said channels of said layer-arranging table and said transfer carriage as said rake is shifted horizontally between its first and second positions.

2. Article stacking apparatus comprising a vertically shiftable layer-arranging table, the upper surface of which is formed by a plurality of laterally-spaced article support members having elongate channels defined therebetween, the opposite end portions of said support members defining upstream and downstream end portions of said table, a vertically shiftable stacking platform positioned downstream of said table, a transfer carriage horizontally shiftable between a first position overlying said layer-arranging table and a second position overlying said stacking platform, the upper surface of said transfer carriage being formed by a plurality of laterally-spaced elongate slats having elongate channels defined therebetween, an overhead rake horizontally shiftable between a first position overlying said layer-arranging table and a second position overlying said stacking platform, said rake including a plurality of laterally-spaced tines having downwardly-projecting ends which are positioned to extend into channels of said layer-arranging table and said transfer carriage, table shifting means for selectively shifting said layer-arranging table from a lowered position to a raised position at which channels of said layer-arranging table are horizontally and longitudinally aligned with channels of said transfer carriage, and platform shifting means for lowering the stacking platform from a position vertically adjacent the plane occupied by said transfer carriage to selected positions spaced below said plane.

3. The apparatus of claim 2 which further comprises article stop means mounted above the plane occupied by said transfer carriage for horizontal shifting between selected positions overlying said stacking platform in a direction substantially parallel to said slats.

4. The apparatus of claim 2 wherein said article support members include a plurality of longitudinally aligned ball rollers.

5. In an article stacking apparatus which comprises a vertically shiftable layer-arranging table having upstream and downstream end portions, a vertically shiftable stacking platform positioned downstream of said table, a transfer carriage horizontally shiftable between a first position overlying said layer-arranging table and a second position overlying said stacking platform, an overhead rake horizontally shiftable between a first position overlying said layer-arranging table and a second position overlying said stacking platform, table shifting means for selectively shifting said layer-arranging table between a lowered position and a raised position wherein said layer arranging table and said transfer carriage are horizontally adjacent, and platform shifting means for lowering the stacking platform from a position vertically adjacent said transfer carriage to selected positions spaced below said carriage, a plurality of layerally-spaced article support members forming the upper surface of said layer-arranging table, said members defining channels therebetween, a plurality of laterally-spaced, elongate slats forming the upper surface of said transfer carriage, said slats defining channels therebetween, and a plurality of laterally-spaced tines forming said rake, with downwardly-projecting ends of said tines positioned to extend into channels of said table with such in its raised position, and into channels of said carriage as said rake is shifted from its first to its second position.

* * * * *

UNITED STATES PATENT AND TRADEMARK OFFICE
CERTIFICATE OF CORRECTION

PATENT NO. : 4,162,016
DATED : July 24, 1979
INVENTOR(S) : Robert A. Schmitt

It is certified that error appears in the above-identified patent and that said Letters Patent are hereby corrected as shown below:

In the specification:

Column 3, lines 17, 18, change "overyling" to --overlying--.

In the claims:

Claim 5, column 6, line 32, delete "layerally" and add --laterally--.

Signed and Sealed this

Twenty-second Day of July 1980

[SEAL]

Attest:

Attesting Officer

SIDNEY A. DIAMOND

Commissioner of Patents and Trademarks